United States Patent [19]

de Jager et al.

[11] 4,276,650

[45] Jun. 30, 1981

[54] METHOD OF SYNCHRONIZING A QUADPHASE RECEIVER AND CLOCK SYNCHRONIZATION DEVICE FOR CARRYING OUT THE METHOD

[75] Inventors: Frank de Jager; Rudolf A. van Doorn; Johannes V. Verboom; Marino G. Carasso, all of Eindhoven, Netherlands

[73] Assignee: U.S. Philips Corporation, New York, N.Y.

[21] Appl. No.: 56,482

[22] Filed: Jul. 11, 1979

[30] Foreign Application Priority Data

Mar. 26, 1979 [NL] Netherlands ............... 7902340

[51] Int. Cl.³ .................. H04L 7/02; H04L 25/48
[52] U.S. Cl. .................................. 375/110; 375/86
[58] Field of Search ............... 370/100, 106; 375/20, 375/86, 95, 110, 114, 116, 118, 54, 55; 328/72, 74, 155

[56] References Cited

U.S. PATENT DOCUMENTS

| | | | |
|---|---|---|---|
| 3,755,736 | 8/1973 | Kaneko et al. | 375/118 |
| 3,876,833 | 4/1975 | Breant | 375/110 |
| 3,950,616 | 4/1976 | Tarmo | 375/114 |
| 4,110,558 | 8/1978 | Kageyama et al. | 375/114 |
| 4,112,498 | 9/1978 | Reiner et al. | 375/114 |

Primary Examiner—Benedict V. Safourek
Attorney, Agent, or Firm—Thomas A. Briody; William J. Streeter; Edward W. Goodman

[57] ABSTRACT

The invention relates to a method for the clock synchronization of a receiver for demodulating a quadphase coded data signal and to a clock synchronization device for carrying out the method.

In the method according to the invention the first bit is compared (correlated) with the third bit and the second bit with the fourth bit: a high degree of correlation indicates that synchronization has been obtained and a low degree indicates absence of synchronization.

5 Claims, 10 Drawing Figures

METHOD OF SYNCHRONIZING A QUADPHASE RECEIVER AND CLOCK SYNCHRONIZATION DEVICE FOR CARRYING OUT THE METHOD

BACKGROUND OF THE INVENTION

The invention relates to a method of synchronizing a binary data signal receiver and particularly has for its object to provide a method of synchronizing a receiver for demodulating a two-level quadphase coded data signal, this data signal comprising a first, a second, a third and a fourth equally long, consecutive half bit interval.

The invention further relates to a clock synchronization device for carrying out the method of synchronizing a receiver of a two-level quadphase coded data signal.

Quadphase coding is known from the article by U. Appel and K. Tröndle: "Zusammenstellung und Gruppierung verschiedener Codes für die Uebertragung digitaler Signale" published in the periodical Nachrichtentechnische Zeitschrift, Vol. 1, 1970, pages 11–16, FIG. 7 in particular. A quadphase coded signal is obtained by dividing a non-coded binary data signal into groups of two bits, denoted dibits. The first and the second bit, respectively, of the dibit is placed in the first and the second, respectively, half bit interval of the coded word and the inverted value of the first and the second bit, respectively, of the dibit is placed in the third and fourth, respectively, half bit interval of the coded word. The coding owes its name "quadphase" to the property that four elementary signals can be distinguished namely 0011, 1001, 0110 and 1100 (allotted to the dibits 00, 10, 01 and 11, respectively).

SUMMARY OF THE INVENTION

The invention relates to a method of synchronizing a binary data signal receiver and, as mentioned in the opening paragraph, has for its object to provide a method of demodulating a two-level quadphase coded data signal. The method is therefore characterized in that a first comparison value is determined from the difference between a sampling value in the first and the third half-bit interval, in that a second comparison value is determined from the difference between a sampling value in the second and the fourth half-bit interval and in that a correction signal is derived from a deviation from the first and/or the second comparison value having predetermined values, the bit synchronization being adjusted to another bit phase by means of this correction signal.

The invention further relates to a clock synchronization device for carrying out the method and, as mentioned in the opening paragraph, has for its object to provide a clock synchronization device for a receiver for demodulating a quadphase coded data signal by means of which synchronization of the receiver is realized in an efficient manner. A clock synchronization device for carrying out the method according to the invention is therefore characterized in that the clock synchronization device comprises a bit and a word synchronization circuit having terminals for connection of the receiver, and in that the bit synchronization circuit generates at least one sampling pulse in each half-bit interval and in that the word synchronization circuit comprises a comparison device for determining a first comparison value from a signal sample in the third half-bit interval and a signal sample in the first half-bit interval and for determining a second comparison value from a signal sample in the fourth half-bit interval and a signal sample in the second half-bit interval and in that the word synchronization circuit comprises decision means, an input of which is connected to the comparison device, for applying a correction signal to the bit synchronization circuit when a deviation from the comparison values having predetermined values is ascertained, in order to adjust the receiver to another word phase by means of the correction signal.

The method according to the invention is based on the following recognition. The signal transmitted in the third and in the fourth, respectively, half-bit interval has a value which is opposite to the signal in the first and the second, respectively, half-bit interval. If the two-level signal is represented as a signal having a positive and a negative polarity and the first comparison value is obtained by adding the signal sample in the first half-bit interval to the signal sample in the third half-bit interval, the first comparison value will furnish a value zero at a correct synchronization. Likewise, the second comparison value will furnish a value zero at a correct synchronization. It is, however, alternatively possible that, although the word synchronization is correct, the comparison values do not furnish a zero because, due to transmission errors, noise etc. one of the sampling values was erroneously detected incorrectly. If the word synchronization is not correct, there are also two possibilities: in a first possibility one or both comparison values furnish a value unequal to zero, which indicates that there is no word synchronization. In a second possibility both comparison values furnish a value zero because the information which is coded in the signal furnishes one of the four quadphase code words in combination with the incorrect word synchronization. The quadphase code words are formed by four out of the sixteen code words which can be formed from four bits. Thus, in the first case, one (out of twelve possible) word, which does not belong to the quadphase code words, is detected and in the second case a word other than the correct quadphase code word is detected. The probability that the second case occurs is considerably smaller than the first case: an incorrect synchronization can therefore be ascertained with a high degree of reliability by consecutively determining the comparison values for a number of times.

A first embodiment of a clock synchronization device according to the invention is characterized in that the word synchronization circuit comprises a store for storing a symbol value of the data signal in the first, second, third and fourth consecutive half-bit intervals and in that the comparison device is connected to an output of the store for the determination, at least once per word, of the first and the second comparison values, each comparison value being represented by a two-level signal consisting of a first symbol and a second symbol, and in that the decision means comprise an adding device and that an input of the adding device is connected to the input of the decision means to determine the number of symbols of one of the two kinds in a sequence of comparison values determined in n (n=2, 3, 4, ...) consecutive words and in that the decision means further comprise a threshold device connected to the adding device for comparing the said number to a predetermined threshold value.

It happens that the received data signal is not correctly detected, for example noise to noise. Instead of a negative polarity a positive polarity will then, for example, be detected. The result is that the synchronization device detects absence of synchronization, although the synchronization is correct. This embodiment has the advantage that the plurality of words (n) belonging to a sequence and the threshold value of the threshold device can easily be adapted to the noise level of the received data signal, so that an optimum detection of the synchronization is ensured.

It is not impossible that in the above-mentioned embodiment a synchronization cycle must be passed through for three times before the correct synchronization has been attained. In such a case the actual word synchronization differs for 3 half-bit intervals from the correct synchronization. To obviate this drawback a second embodiment of a clock synchronization device according to the invention is characterized in that the comparison device comprises a peak-value detector and a window comparator, connected thereto, for determining at least once per word the first and the second comparison value, which comparison values are represented by a two-level signal consisting of a first and a second symbol and in that the peak-value detector comprises an input terminal for receiving a signal composed from the data signal and the data signal delayed for one bit interval by a delay device, and that an output of the window comparator is connected to the decision means and in that the decision means comprise a first and a second adding device, which are connected in parallel to the input of the decision means and in that the first adding device determines the number of symbols of one of the two kinds in a sequence of first comparison values determined in n (n=2, 3, 4, . . . ) consecutive words, and in that the second adding device determines the number of symbols of one of the two kinds in the sequence of second comparison values and in that the decision means further comprises a decoding device connected to the two adding devices for decoding the two results of the adding operations and for setting the receiver to the correct word phase by means of the correction signal corresponding to these results.

It happens that the quadphase coded information is presented in the form of data blocks. The data blocks are preceded by a synchronization signal to ensure correct synchronization of the receiver at the beginning of the data blocks. The synchronization signal is known at the receiving end and can therefore be utilized to ascertain whether the word synchronization of the receiver is correct and, if not so, in what manner it should be corrected. In principle, in the absence of interfering signals, a non-recurrent determination of the first and the second comparison value is sufficient therefore. According to the invention, a third embodiment of a clock synchronization device having this object is characterized in that the first and the second comparison values are represented by a two-level signal consisting of a first symbol and a second symbol and in that the decision means comprise a decoding device, an input of which is coupled to the input of the decision means for applying a correction signal to the bit synchronization circuit, when a deviation of the first and/or the second comparison value from the known synchronization signal is detected, in order to set the receiver to the correct word phase.

DESCRIPTION OF THE DRAWINGS

The invention and its advantages will be further explained with reference to some Figures, wherein corresponding elements are given the same reference symbols.

In these Figures:

FIG. 9a shows a fourth embodiment of a clock synchronization device according to the invention for use in a quadphase receiver as shown in FIG. 2, FIG. 4 or FIG. 5; and FIG. 9b shows a signal form occurring in the clock synchronization device as shown in FIG. 9a.

DESCRIPTION OF THE PREFERRED EMBODIMENTS

For data transmission systems the digital information is often translated, at the transmitting end, to signals which are more suitable for transmission over the transmission channel. The translation can be effected by means of modulation, coding or by filtering, or combinations of these methods. The receiver performs an inverse transformation, whereby the information is converted to the original form.

Figure 1:
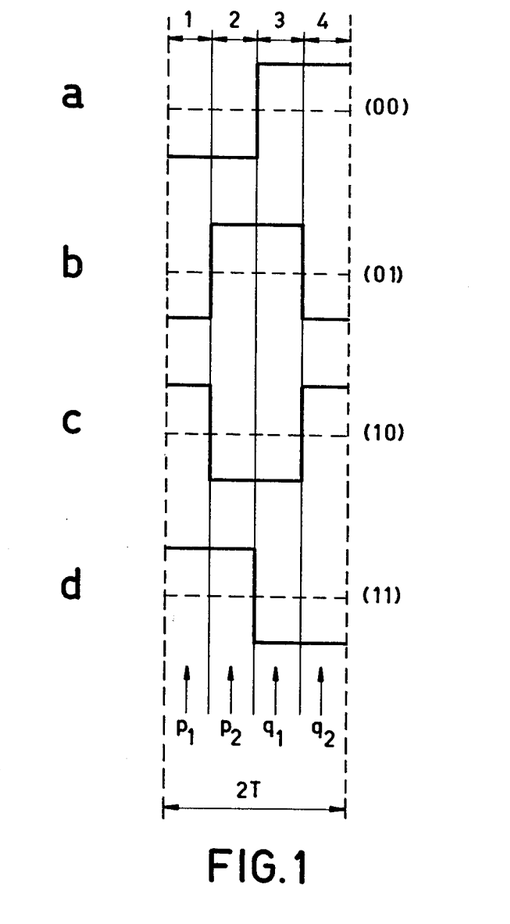
FIG. 1 shows the four elementary signal forms of a quadphase code.

A binary code which is particularly suitable for this purpose is the quadphase code (FIG. 1). The code rules for quadphase coding are as follows. The data bits of the binary information in the original form is divided into two-bit words, denoted dibits. A quadphase coded word consists of two equally long bit intervals, each divided into half-bit intervals. The dibit is transmitted in the first and the second half-bit interval 1 and 2, respectively, of the coded word. The inverted value of the dibit is transmitted in the third and fourth half-bit interval, 3 and 4, respectively, of the coded word. FIG. 1 shows the four possible elementary signals of a quadphase signal wherein, by way of example, a logic "one" is represented by a positive signal level and a logic "zero" by a negative signal level. So, when quadphase coded, the dibit 00 furnishes 0011 (FIG. 1a), 01 furnishes 0110 (FIG. 1b), 10 furnishes 1001 (FIG. 1c) and 11 furnishes 1100 (FIG. 1d). The code owes its name to the property that four elementary signal forms can be distinguished in a quadphase coded signal. (In the article by U. Appel and K. Trö ndle: "Zusammenstellung und Gruppierung verschiedener Codes für die Uebertragung digitaler Signale", Nachrichten-technische Zeitschrift, Volume 1, 1970, pages 11–16, this code is denoted as binary block code). The quadphase code words 0011, 0110, 1001 and 1100 form only four of the sixteen possible code words which can be formed by means of four bits. Consequently, quadphase coding has a high redundancy. This high redundancy is advantageously used for the clock synchronization.

Figure 2:
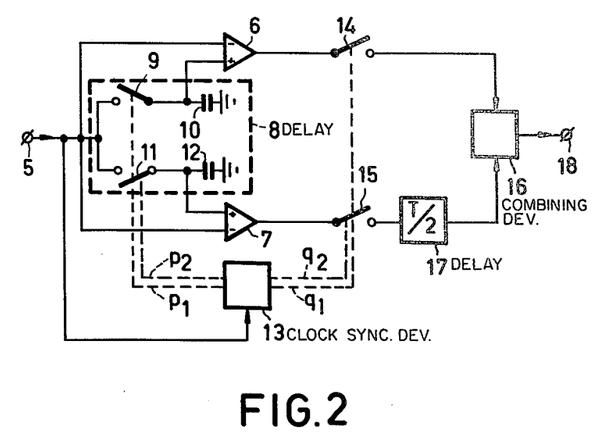
FIG. 2 shows a first embodiment of a quadphase receiver as described in the co-pending application Ser. No. 053,577, filed June 29, 1979.

FIG. 2 shows a first embodiment of a quadphase receiver. A quadphase coded signal is applied to an input terminal 5 of the quadphase receiver. The input terminal 5 is connected to inverting inputs of a first comparator 5 and a second comparator 7, and to an input of a delay device 8. The delay device 8 comprises a first sample-and-hold circuit which includes a first single-pole switch 9 and a first comparator 10, and a second sample-and-hold circuit which includes a second single-pole switch 11 and a second capacitor 12. A control input of the first and of the second switch 9 and 11, respectively, is coupled to a clock synchronization device 13 (schematically shown in FIG. 2 by means of a dotted line). The clock synchronization device 13 still to be further described hereinafter is connected to the input terminal for recovering bit and word synchronous clock signals from the received signals. At instant p1 (see FIG. 1) the control input of the switch 9 receives a sampling pulse which has for its purpose to close this switch 9 for a short period of time (shorter than T/2), in response to which capacitor 10 is charged to a value which is a measure of the value of the signal at the input terminal at the instant p1. Likewise, the control input of the switch 11 of the second sample-and-hold circuit receives at instant p2 (FIG. 1) a sampling pulse for closing this switch 11, in response to which capacitor 11 is charged to a value which is a measure of the value of the signal at the input terminal at instant p2. The comparators 6 and 7, respectively, determine difference signals from the signal at the input terminal 5 and the respective voltages to which the capacitors 10 and 12, respectively, were charged, these difference signals being applied to respective poles of single-pole switches 14 and 15, respectively, which are connected to the outputs of the comparators 6 and 7, respectively. A control input of each switch 14 and 15 is coupled to the clock synchronization device 13, as shown schematically in FIG. 2 by means of a dotted line. The method explained above can be summarized as follows: the signal is correlated with a delayed version of that signal without intersymbol interference being produced. This operation results in a "matched filter" operation which inter alia effects an optimum suppression of the noise components relative to the information.

A quadphase coded word comprises the original (non-coded) information in the first and the second half-bit interval and the original (non-coded) information in the inverse sense in the third and the fourth half-bit interval. By determining the quadphase coded signal at the instants p1 and q1, p2 and q2, respectively, the correlated information is therefore combined. This combined information must thereafter be detected at a suitable instant. To this end a sampling pulse which has for its purpose to close this switch 14 for a short period of time (shorter than T/2) is applied to the control input of switch 14 at instant q2 (FIG. 1), in response to which a difference signal at the output of comparator 6 at instant q1 is applied to the input of a combining device 16. Likewise, a sampling pulse which has for its purpose to close switch 15 for a short period of time is applied to the control input of switch 15 at instant q2 (FIG. 1) in response to which the difference signal at the output of comparator 7 at instant q2 is applied to the combining device 16 via a delay element 17. Each word of a quadphase coded signal (word repetition frequency 1/(2T)) is therefore sampled at four predetermined instants. This detection has the advantage that the output signal of the receiver is increased (3 dB), so that a more reliable receiver is realized. In addition, the receiver is better protected from variations in the d.c. level of the received signal. Also noise signals having a frequency equal, or approximately equal, to the frequency (1T) are suppressed to an increased extent by this doubled detection.

The sampling instants q1 and q2 differ by a half-bit interval (T/2). In order to obtain the information bits at equidistant instants, the difference signal of differential amplifier 7, sampled by switch 15 at instant q2 is delayed for a period of time equal to a half-bit interval (T/2). The combining device 16 interleaves the sample attained at instant q1 with the delayed sample attained at instant q2 for supplying the decoded, original data signal at an output terminal 18. Trigger circuits or electronic switches can alternatively be used instead of the described mechanical switches. So, the switches 9 and 11 can, for example, be realized by means of IGFET transistors (BSV81) and the switches 14 and 15 by means of an integrated trigger circuit (SN7474).

It is, alternatively, possible to use differential amplifiers instead of comparators for the difference circuits 6 and 7. A comparator produces at the output a two-level digital signal which is a measure of the difference of the "analog" signals at the two inputs. With a differential amplifier an analog signal which is a measure of the difference of the "analog" signals at the two inputs is available at the output. When a differential amplifier is used it is therefore usually required to perform an extra processing operation on the output signal (adapting the voltage level, rectification) in order to make the signal suitable for sampling by the switches 14 and 15, respectively (which are, for example, constructed as trigger circuits).

It is not necessary to take additional measures to discharge the capacitors 10 and 12 for the sample-and-hole circuits as the value of these capacitors 10, 12 can be chosen so that for consecutive samples the stored quantities of charge are substantially independent of the previously stored changes.

In the above-described embodiment the value of the quadphase coded data signal is determined once in each half bit interval. If the data signal comprises very strong noise components, for example because the bandwidth of the transmission channel is wide relative to the bandwidth of the quadphase signal, the reliability of the detection can be increased by filtering the data signal before applying it to the receiver or by integration of the data signal over a half-bit interval.

Such a receiver is particularly suitable for use in the fields of data transmission over physical wire pairs and magnetic or optical recording. The receiver has a number of advantages. One advantage is that the receiver need only have a narrow frequency band. Compared to a code which is often used in magnetic recording-biphase coding—approximately only half the frequency band is required. In contrast to a code which is known as the Miller code, quadphase coding furnishes a signal which does not contain a d.c. component. This means that there is no restoration of the direct current in a quadphase receiver. In addition, a quadphase signal has a sufficient number of zero crossings (on an average one per bit interval), so that the clock frequency can be regenerated in a simple manner in a quadphase receiver. An advantage the quadphase code shares with all two-level codes is that when this code is used in the field of magnetic recording writing into magnetic saturation is possible. Information which is recorded in the magnetic carrier is overwritten, so that erasing before writing is unnecessary. A further advantage is that the power spectrum of a quadphase coded signal has a zero point at the bit frequency (1/T) which offers the possibility to situate a pilot frequency there. The spectrum of a biphase coded signal indeed has a zero point, but this does not occur, at a certain bandwidth, until at a frequency which is twice the bit frequency (2/T). Consequently, the cut-off frequency of the biphase system will be an obstacle for the use of this zero point in many cases.

Figure 3:
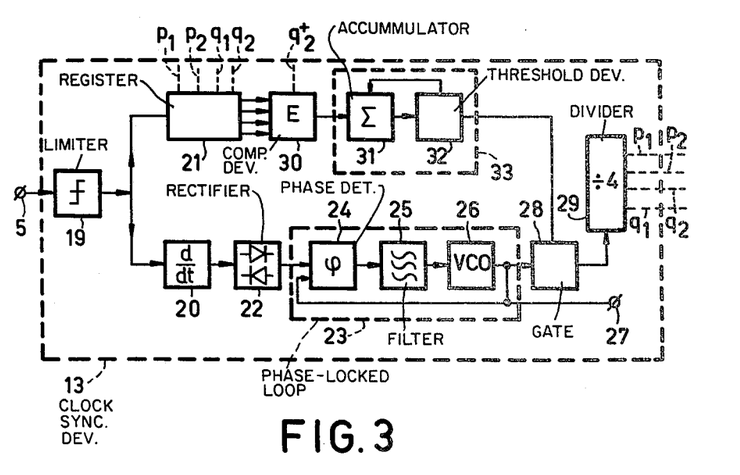
FIG. 3 shows a first embodiment of a clock synchronization device according to the invention for use in a quadphase receiver as shown in FIG. 2.

FIG. 3 shows an embodiment of a clock regeneration device for use in a quadphase receiver, for example a quadphase receiver as shown in FIG. 2. In the clock regeneration device a frequency, which is equal to twice the bit frequency (2/T) is recovered from the received signal. Since a quadphase coded data signal has transitions which follow one another with a time interval of T/2, 2 T/2, 3 T/2 or 4 T/2, by selecting the frequency 2/T herefrom, the period time of this frequency corresponds to the time interval between two consecutive samples in the receiver (T/2). Samples of a given type, for example the p1-samples, occur only once in each word, consequently with a four times lower frequency. This frequency can be determined by means of division from the frequency 2/T. This is effected by applying the quadphase signal received at the output terminal 5 to a limiter 19, to which a differentiating network 20 and a register 21 are connected. The differentiating network 20 generates a pulse at each signal transition. These pulses are applied to a full-wave rectifier 22 for applying a random pulse train, having an (average) clock frequency of 2/T, to a phase-locked loop 23. The phase-locked loop (PLL) 23 comprises, in this order, a phase detector 24, a loop filter 25 and a voltage-controlled oscillator 26. The output of the voltage-controlled oscillator 26 is connected to a control input of the phase detector 24. The loop filter 25 applies a voltage to the voltage-controlled oscillator 26 which is proportional to the phase difference between the input signal of the phase detector 24 and the control signal of the phase detector 24, in response to which the phase-locked loop 23 is locked in known manner onto the frequency 2/T. This frequency, the clock frequency, is available at an output 27 of the PLL. The clock frequency 2/T is applied to a divider 29 having a division factor 4 via a gate 28. Sampling signals for the switches 9, 11, 14 and 15 are then available at outputs of divider 29, each sampling signal having a frequency of 1/2T (half the bit frequency) and a phase of 0°, 90°, 180° and 270°. Because of the presence of divider 29 there is no certainty about the phase, so that, depending on the phase in which the divider starts, the phase of the sampling signals can differ 0°, 90°, 180° and 270° from the desired values. In addition, synchronization of the receiver at the start of the reception is not known, or the synchronization of the receiver is destroyed, by interferences in the received signal. In order to eliminate these uncertainties, the clock synchronization device 13 is provided with a monitor or word synchronization circuit. This word synchronization circuit comprises the register 21 and a comparison device 30. The signal limited by the limiter 19 is sampled at the sampling instants p1, p2, q1 and q2 and the sampling values Up1, Up2, Uq1 and Uq2, which therefore represent the polarity of the received quadphase coded signal at the instants p1, p2, q1 and q2, are stored in the register 21. After the instant q2 the sampling values are applied to the comparison device 30 where the logic function $$E = \overline{(Up1 \oplus Uq1) \cdot (Up2 \oplus Uq2)}$$

is performed ($\oplus$ corresponds to modulo-2 addition).
There are four distinct possibilities:
1. E=0. Modulo-2 addition of a signal value to the correlated signal value in the sense described above furnishes 0 if the word synchronization is correct.
2. E=0. Modulo-2 addition of a signal value at a different signal value accidentally furnishes (depending on the coded information) E=0, whereas the synchronization is not correct. Should the coded quadphase signal consist of a sufficiently long sequence of such words it is impossible to obtain synchronization. This can be prevented by known techniques (for example scrambling).
3. E=1. Although the word synchronization is correct, a signal value has been incorrectly ascertained, owing to a transmission error, an interference, etc.
4. E=1. Word synchronization incorrect.

In order to be able to distinguish between these possibilities, the output of the comparison device 30 is connected to an accumulator 31, which forms part of a decision means 33. The accumulator 31 adds consecutive values of E ($E_1, E_2, \ldots E_m$) together and this value $$\sum_{i=1}^{n \leq m} E_i$$

is applied to a threshold device 32, which has an adjustable threshold. The threshold level of this threshold device 32 is chosen so high that, with a correct synchronization at the transmission quality then prevailing (noise, cross-talk) the threshold value is not exceeded. It was found that a threshold level corresponding to 0.4 m is very satisfactory in practice. Should the signal applied to the threshold device 32 exceed the threshold value, a signal is applied to a control input of the gate 28 in response to which the signal coming from the phase-locked loop is suppressed once for a half a period (T/2) and the phase of each of the output signals of the divider 29 is shifted over 90°. Exceeding the threshold value also generates a signal with which accumulator 31 is reset to zero. Accumulator 31 is constructed as a modulo-m counter, so that it is reset after m consecutive values of E. In the case no 270° phase shift occurs between the phase of each of the actual sampling pulses supplied by the divider 29 and the desired value, the actual synchronization is generally equal to the desired synchronization after three sequences. In practice it appeared that m=16 is an advantageous value. This clock regeneration device has the advantage that a distinction is made in a reliable manner between transmission errors due to, for example, noise and incorrect synchronization. A further advantage is that when the statistical properties of the received quadphase coded signal change due to noise or interference (error probability smaller or greater), the clock regeneration device is adapted in a simple manner by a corresponding different setting of the threshold value and the length of the sequence m.

The sampling values which were generated in the receiver for the demodulation of the quadphase coded signal have been obtained in a different manner then the sampling values for the word synchronization. It is, therefore, conceivable that, although the word synchronization device erroneously detects absence of synchronization, the signal which was demodulated by the receiver is correct. As this occurs only occasionally, the word synchronization device is protected therefrom by the threshold device.

Figure 4:
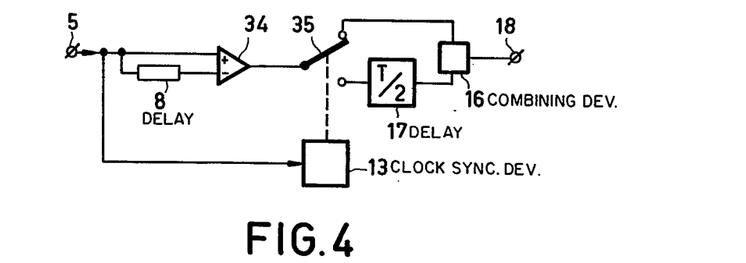
FIG. 4 shows a second embodiment of a quadphase receiver as described in the co-pending application Ser. No. 053,577, filed June 29, 1979.

FIG. 4 shows a second embodiment of a quadphase receiver. In the first embodiment described above, the sampling values are, in the first instance, processed in parallel at the instants p1, q1 and p2, q2, respectively, and thereafter interleaved to form one equidistant and sequential signal. The first embodiment might be denoted a space-division system. In the second embodiment the sampling values are, in the first instance, processed in series, thereafter separated from one another and thereafter interleaved to form one equidistant and sequential signal. The second embodiment might be denoted a time-division system.

The quadphase coded signal which is received in the second embodiment at the input terminal 5 is applied directly and via a delay device 8 to a differential amplifier 34. The time delay of the delay device 8 is equal to one bit interval (T). The delay device 8 may be constructed as an analog (for example, Charge Transfer Devices of Sample-and-Holds) or a digital shift register, or as a delay line. The difference signal of the coded quadphase signal and the quadphase signal which was delayed for one bit interval is applied to a pole of a single-pole change-over switch 35. A control input of change-over switch 35 is coupled to the clock regeneration device 13, as shown schematically in FIG. 4 by means of a dotted line. The clock regeneration device 13 is connected to the input terminal 5 for recovering bit and word synchronous clock signals from the received signal. At instant q1 (see FIG. 1) there is applied to the control input of the change-over switch 35 a sampling pulse which adjusts the switch 35 for a short period of time (in any case shorter than T/2) to the shown first position, in response to which the difference signal at the output of the differential amplifier is applied to the combining device 16 at instant q1. Like-wise, the control input of the change-over switch 35 is adjusted at instant q2 (FIG. 1) for a short period of time to the second position, not shown, in response to which the difference signal is applied to the combining device 16 via the delay element 17 at instant q2. In the manner already shown for FIG. 2 the interleaved, decoded, original data signal is applied at equidistant instants to the output terminal 18. The second embodiment differs in some additional points from the first embodiment. A first difference is that for the second embodiment the storage device can be realized in a simple manner for a receiver for bit frequencies above approximately 200 KHz: a single delay element (coil) is sufficient. In contrast therewith the receiver for the first embodiment is more suitable for lower frequencies, but can be used to some MHz. A further difference is that the second embodiment requires only one differential amplifier because the differential amplifier is used to supply a difference signal at instant q1 as well as at instant q2.

Figure 5:
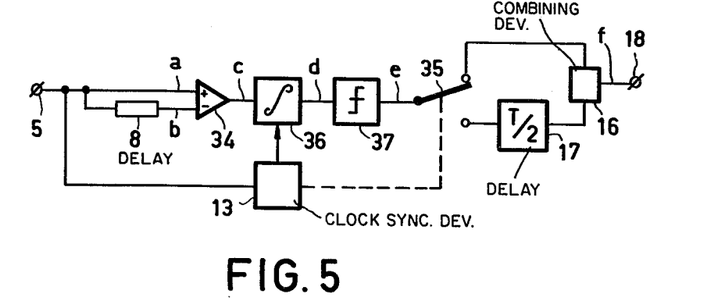
FIG. 5 shows a modified second embodiment of a quadphase receiver as described in the co-pending application Ser. No. 053,577, filed June 29, 1979.
Figure 6:
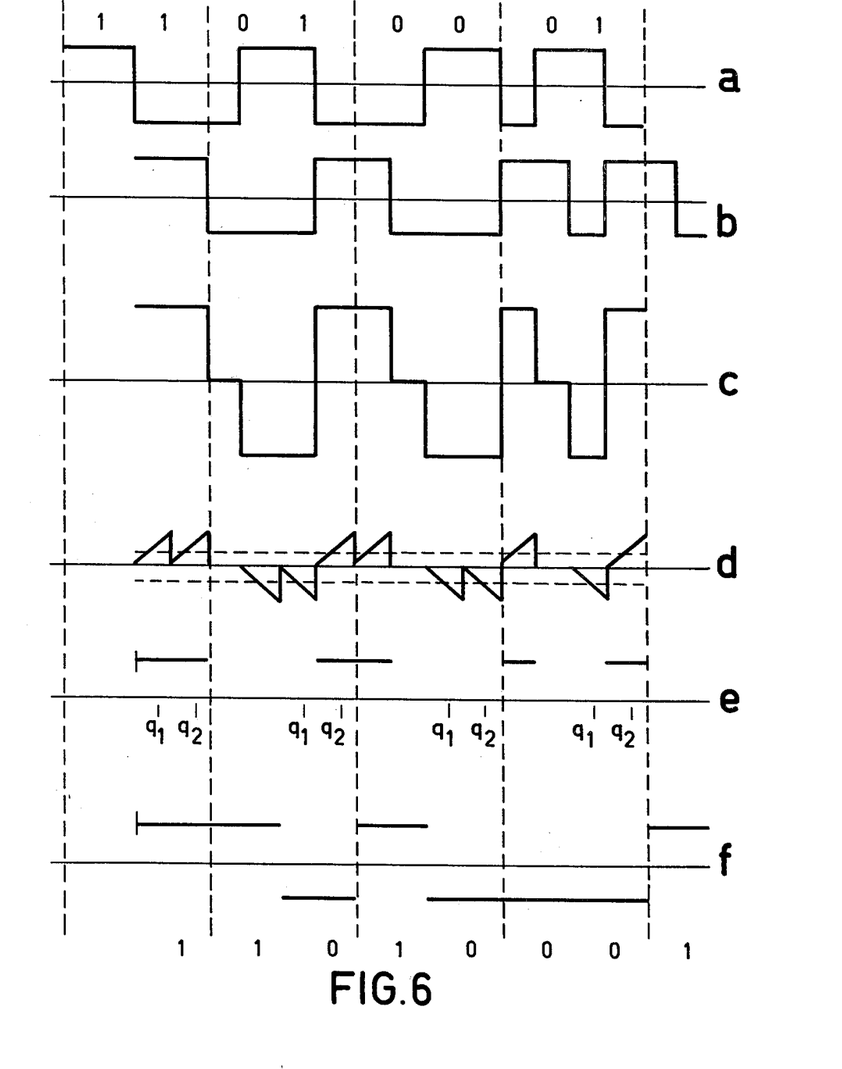
FIG. 6 shows some signal forms occurring in a quadphase receiver as shown in FIG. 4 or FIG. 5.

If the quadphase coded signal received at input terminal 5 is disturbed to a very high extent, for example by noise, the detection of the signal is improved with a modification of the embodiment shown in FIG. 4, i.e. integrating the output signal of the differential amplifier, as shown in FIG. 5. Some idealized signal forms occurring in the modified embodiment of FIG. 5 are shown in FIG. 6. The input signal (a, FIG. 6) and the input signal, delayed for one bit interval (b, FIG. 6) are applied to the differential amplifier 34. The output signal of the differential amplifier 34 (c, FIG. 6) is applied to an integrator 36 which is connected to the clock generator 13. The integrator 36 is reset to zero at the beginning of each half-bit interval and, consequently, produces a signal shown as d. Via a limiter 37 this signal is applied to the pole of change-over switch 35. The output signal of limiter 37, signal e, is converted in the manner, described for FIG. 2, into the original, non-coded signal (f, FIG. 6).

Figure 7:
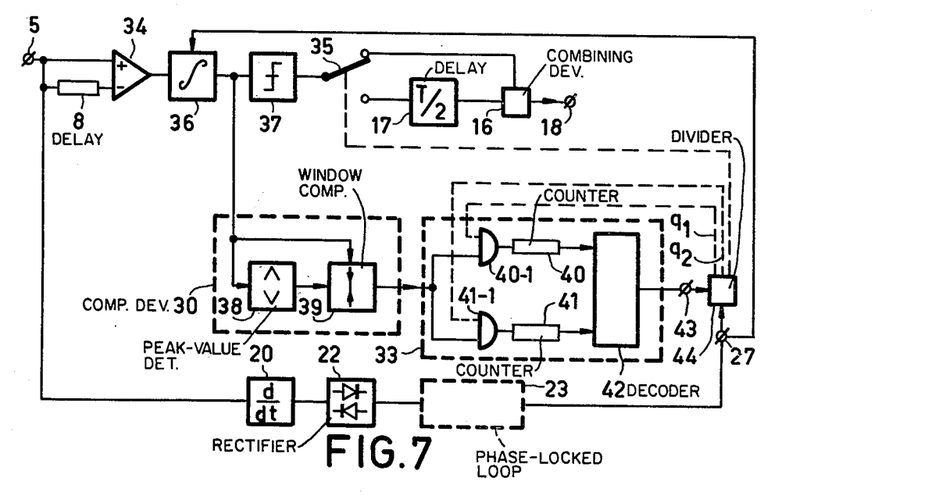
FIG. 7 shows a second embodiment of a clock synchronization device according to the invention for use in a quadphase receiver as shown in FIG. 4 or FIG. 5.

As mentioned above, the first embodiment of the clock synchronization device has the drawback that, in the worst case, the word synchronization does not have the correct value until after three cycles. A clock synchronization device which obviates this drawback is shown in FIG. 7. FIG. 7 also includes the receiver shown in FIG. 5.

The bit synchronization circuit comprises, in this order, the differentiating network 20, the fullwave rectifier 22, the phase-locked loop 23 and a divider 44. The bit synchronization circuit operates in the manner described for FIG. 3. The word synchronization circuit comprises a comparison device 30, an output of which is connected to the decision means 33. The comparison device 30 is connected to the output of the integrator 36. This has the advantage that the integrated difference between the data signal and the data signal delayed for one bit interval T is available at that output, so that a store for the word synchronization circuit is not necessary. (The function of register 21 in FIG. 3 is performed in the present, second embodiment by the delay device 8). The comparison device 30 comprises a peak-value detector 38 which has an input connected to the output of integrator 36. The peak-value detector 38 determines in known manner the instantaneous peak value of the input signal. The output of the peak-value detector 38 is connected to the input of a window comparator 39. A control input of the window comparator 39 is connected to the output of integrator 36. The window comparator determines whether the input signal is located within a minimum and a maximum value, derived from the control signal, and, if this is not the case, it produces a pulse at the output. Such a window comparator is known from: "Operational Amplifiers, Design and Application", by Tobey, Craeme and Huelsman, published by McGraw Hill, New York, page 365 in particular. The output of the window comparator 39 is connected to the input of the decision means 33. The decision means 33 comprises a series arrangement of a first AND-gate 40-1 and a first counter 40, and a series arrangement of a second AND-gate 41-1 and a second counter 41. A first input of the two AND-gates is connected to the input of the decision means 33. A second input of the first AND-gate 40-1 is connected to the divider 44 for setting the second input at instant q1 and a second input of the second AND-gate 41-1 is connected to the divider 44 for setting the second input at instant q2. If at instant q1 the first input of the first AND-gate 40-1 is set by a pulse, supplied by the window comparator 39 then the counting position of counter 40 is increased by one via the AND-gate 40-1.

Likewise, if at instant q2 the first input of the second AND-gate 41-1 is set by a pulse the counting value of the second counter 41 is increased by one. This cycle is repeated for a total of n times, that is to say it is determined for a sequence of n consecutive data words at the instants q1 and q2, respectively, how many times the window comparator 39 has been energized. There are the following possibilities. When the synchronization is correct, the output signal of the integrator 36 (d, FIG. 6) has a value unequal to zero at all instants q1 and q2. The window comparator does not supply an output signal and, consequently, the counting position of the counters is not increased and at the end of the sequence both counters are still in the O-position. In the three other possible cases, namely in which the actual synchronization is shifted $\frac{1}{4}$, $\frac{1}{2}$ or $\frac{3}{4}$ dibit relative to the correct synchronization, the counting position of at least one of the counters 40, 41 will be increased. So, for a word synchronization shifted $\frac{1}{4}$ dibit, that is to say at instant q2 in the original signal, the actual signal is sampled as if it were the q1 instant (d, FIG. 6), then a signal unequal to zero will be available at all these instants at the output of integrator 36. However, at the q2 instant in, on an average, half the cases, a signal having a value zero will be sampled. This implies that the counter 40 has the value zero at the end of the sequence of n samples, and in counter 41, a value unequal to zero. For a shift of $\frac{3}{4}$ dibit (or $-\frac{1}{4}$ dibit) the complementary case occurs: counter 41 has a value zero at the end of the sequence and counter 40 has a value unequal to zero. For a shift of $\frac{1}{2}$ dibit the counting positions of the two counters 40 and 41 are increased to a comparable extent.

The first and the second embodiment differ also in the following respect. For the first embodiment, a period of the output signal of the voltage-controlled oscillator 26 is suppressed (by means of gate 28) after absence of synchronization has been detected, which implies that a bit information is sacrificed ("skipped") in the receiver. In the worst case 3 bits can be lost in this manner. In the second embodiment the correction is effected directly and in the forward or the reverse direction, so that generally no bits will be sacrificed or added.

Due to transmission errors, noise etc., the counters 40 and 41 will generally have a final position unequal to zero at the end of the sequence of n words, even when the synchronization is correct.

In a corresponding manner as for the embodiment shown in FIG. 3, the embodiment shown in FIG. 7 has the advantage that the final value of the counters which are considered to be "zero", can be chosen so high that it is not exceeded at the prevailing transmission quality. To that end outputs of the counters 40 and 41 are connected to a decoding device 42 which forms part of the decision means 33. Decoding device 42 chooses the counter final positions and codes them as $T_1T_2=00$, 01, 10 or 11, "0" representing a value below the threshold value and "1" a value above the threshold value. A correction signal, corresponding to one of the four possible combinations of counter final positions, is added to the control input 43 of the divider 44. In response thereto the divider 44 is set to the correct phase.

When using a quadphase receiver for receiving data blocks a special problem is encountered. The information of the data block is of such a nature that loss of information due to incorrect synchronization cannot be tolerated. To prevent this, the data blocks are preceded by a synchronization signal. The synchronization signal is known to the receiver so that it can be determined in a simple manner whether the word synchronization of the receiver is correct.

Figure 8:
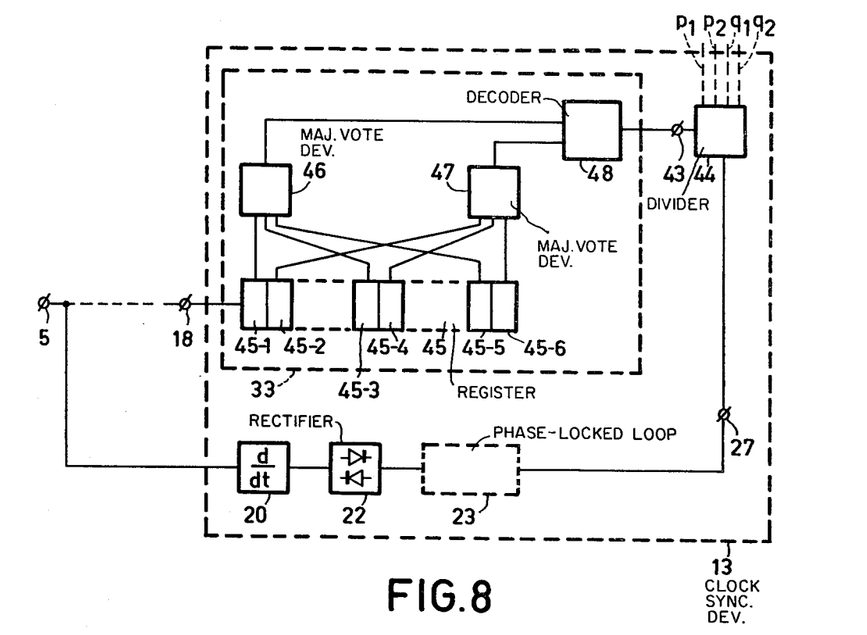
FIG. 8 shows a third embodiment of a clock synchronization device according to the invention for use in a quadphase receiver as shown in FIG. 2, FIG. 4 or FIG. 5.

FIG. 8 shows an embodiment of a clock synchronization device 13 which is extremely suitable for that purpose.

A bit synchronization circuit comprising, in this order, the differentiating network 20, the full-wave rectifier 22, the phase-locked loop 23 and the divider 44, is connected to the input terminal 5 of the receiver. The bit synchronization circuit operates in the manner described for FIG. 4. A comparison device (30) for comparing the sampling values to each other is included in the first and the second embodiment of the clock regeneration device. In the present embodiment, the receiver performs this function. The decision means are connected to the output terminal 18 of the clock phase receiver. The decision means 33 comprises a register 45, an input of which is connected to the input of the decision means 33. The register comprises 2n (n=3, 4, 5, ...) elements, inter alia 45-1 to 45-6 inclusive. Any even number of elements may be arranged between the elements 45-2 and 45-3 and between 45-4 and 45-5. The register 45 is suitable for storing n words of the synchronization signal. The elements corresponding to at least three words are provided with an output (in FIG. 8 the elements 45-1 to 45-6, inclusive). The outputs of the elements wherein the first symbol of a synchronization word is stored (45-1, 45-3, 45-5) are connected to a first majority vote device 46 and the outputs of the elements wherein the second symbol of a synchronization word is stored (45-2, 45-4, 45-6) are connected to a second majority vote device 47. After register 45 has been filled with the synchronization signal which was decoded by the receiver, the majority vote devices 46 and 47, respectively, determine which symbol in the elements 45-1, 45-3, 45-5 and 45-2, 45-4, 45-6, respectively, are stored with a majority. The symbol which is in the majority is applied by each majority vote device 46, 47 to the decoding device 48, which applies a correction signal corresponding therewith to the control input 43 of the divider 44. This achieves that the correct word synchronization has been obtained or is obtained at the end of the synchronization signal.

It is, however, not necessary to use majority vote devices in all circumstances. If the quadphase coded signal applied to the receiver is of such a high quality (little noise etc.) that transmission errors or receiving errors are substantially impossible, the detected signal available at the output 18 of the receiver can be applied directly to the decoding device 48.

Figure 9:
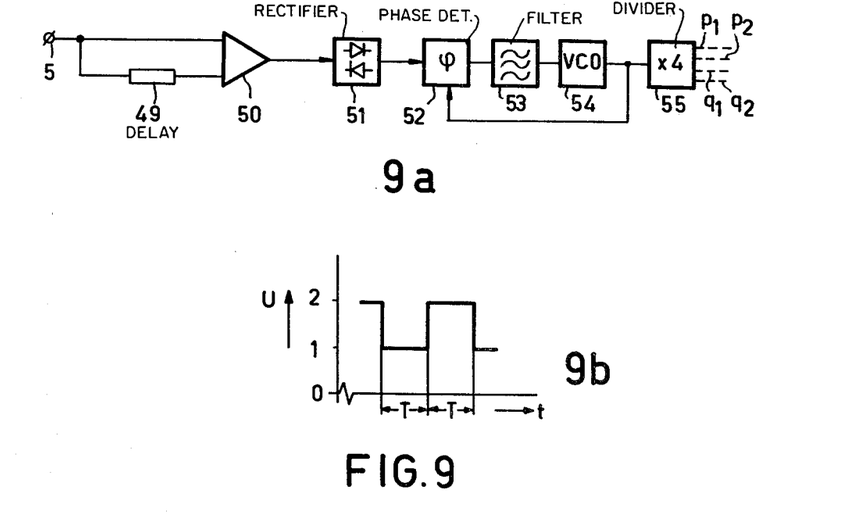

FIG. 9a shows a fourth embodiment of a clock synchronization device. The quadphase coded data signal received at input terminal 5 is applied directly and via a delay device 49 to inputs of a differential amplifier 50. The time delay of the delay device 49 is equal to one bit interval (T). The output signal of the differential amplifier 50 is applied to the full-wave rectifier 51. The clock synchronization device is based on the following recognition. If the two-level quadphase coded signal is represented as a signal having a positive value (for example the value 1) and a signal having a negative value (for example the value $-1$), then the output signal of differential amplifier 50 has a value +2 at the sampling instants which are bit and word synchronous and, depending on the information, a signal value +2, 0 or $-2$ at the remaining scanning instants. After full-wave rectification, the signal at the first-mentioned instants have an average value +2 (neglecting transmission errors etc., namely continuously a value +2) and at the last-mentioned instants an average value +1 (the average of +2, 0, 0 −2 for an assumed random distribution of positive and negative signal values). FIG. 9b shows such an average signal form. The frequency 1/2T can be selected therefrom with an unambiguous phase by means of a phase-locked loop consisting of a phase comparator 51, a loop filter 52 and a voltage-controlled oscillator 54. A signal having this frequency (word frequency) is applied to a device 55, which multiplies this frequency by four and which makes four sampling pulses per word interval available at the output.

When using the fourth embodiment of the clock synchronization device with a quadphase receiver shown in FIG. 1 or FIG. 5 the delay device 49 and differential amplifier 50 can be replaced by the corresponding circuit formed by delay device 8 and differential amplifier 34, which circuit forms part of the receiver. In that case the input of the full-wave rectifier 51 is connected to the output of differential amplifier 34 of the receiver, as shown in FIG. 4 or FIG. 5.

What is claimed is:

1. A method for the clock synchronization of a receiver for demodulating a quadphase coded data signal, said data signal comprising data words consisting of first, second, third and fourth equally long, consecutive half-bit intervals, characterized in that the steps of said method comprise:
    (a) determining the frequency of the half-bit intervals of said data words;
    (b) sampling the data words at the frequency determined in step (a);
    (c) storing the sampling values for at least four half-bit intervals;
    (d) determining a first comparison value from the difference between the sampling values of the third and first, respectively, of said four half-bit intervals;
    (e) determining a second comparison value from the difference between the sampling values of the fourth and second, respectively, of said four half-bit intervals;
    (f) comparing said first and second comparison values to respective predetermined values corresponding to a correct phase relationship with said data words; and
    (g) forming a correction signal to adjust the phase of said frequency with respect to the data words when either of said first or second comparison values differ from the respective predetermined values.

2. A clock synchronization device for synchronizing a receiver for demodulating a quadphase coded data signal, said data signal comprising data words consisting of first, second, third and fourth equally long, consecutive half-bit intervals, characterized in that said clock synchronization device comprises a bit synchronization circuit, for generating a repetitive sequence of four sampling pulses in synchronism with the half-bit intervals of the data words in said data signal, and a word synchronization circuit for adjusting the word phase of said bit synchronization circuit, said word synchronization circuit comprising sampling means for sampling said data signal in response to said sampling pulses, a comparison device coupled to said sampling means for forming a first comparison value, from the difference between a third and a first sampling value, and a second comparison value, from the difference between a fourth and a second sampling value, and decision means coupled to said comparison device for applying a word phase correction signal to said bit synchronization circuit when either said first or said second comparison value exceeds a predetermined value.

3. A clock synchronization device as claimed in claim 2 wherein said word synchronization circuit further comprises a store coupled to said sampling means for repetitively storing the sampling values of the data signal corresponding to the four sampling pulses, said comparison device being connected to an output of said store and being arranged to form a third comparison value, by combining said first and second comparison values, at least once for each cycle of sampling pulses, said third comparison value being represented by a two-level signal, and wherein said decision means comprises an adding device connected to said comparison device, for adding together the third comparison values corresponding to n, n being an integer, consecutive cycles of sampling pulses, and a threshold device connected to said adding device for comparing the amount in said adding device after n cycles with a predetermined threshold level whereby the exceeding of said threshold level by the amount in said adding device is indicative of said bit synchronization circuit having the incorrect word phase resulting in a word phase correction signal being generated by said threshold device.

4. A clock synchronization device for synchronizing a receiver for demodulating a quadphase coded data signal, said data signal comprising data words consisting of first, second, third and fourth equally long, consecutive half-bit intervals, characterized in that said clock synchronization device comprises a bit synchronization circuit for generating a repetitive sequence of sampling pulses in synchronism with the half-bit intervals of the data words in said data signal, and a word synchronization circuit for adjusting the word phase of said bit synchronization circuit, said word synchronization circuit comprising a comparison device having a peak-value detector and a window comparator connected thereto for determining a first and a second comparison value at least once every four half-bit intervals, said comparison values each being represented by a two level signal consisting of a first and a second symbol, said peak-value detector having an input terminal for receiving a signal which is a combination of the data signal and the data signal delayed for two half-bit intervals, and decision means coupled to said comparison device, said decision means comprising a first and a second adding device connected in parallel to the input thereof, whereby said first and second adding devices respectively determine the number of said first and second comparison values having said first symbol respectively, in a sequence of n, n being an integer, consecutive words, and a decoding device connected to said first and second adding devices for decoding the results obtained in said two adding devices and for generating a word phase correction signal corresponding to said decoded results for adjusting the word phase of said bit synchronization circuit.

5. A clock synchronization device as claimed in claim 4 characterized in that the decoding device comprises a first and a second threshold device, said first threshold device being connected to said first adding device and said second threshold device being connected to said second adding device, wherein said first and second threshold devices produce two-level output signal which, when combined, form the correction signal.

* * * * *